Patented Mar. 15, 1949

2,464,200

UNITED STATES PATENT OFFICE 2,464,200

MANUFACTURE OF STABLE DRY PAPAIN COMPOSITION

Lloyd A. Hall, Chicago, Ill., assignor to The Griffith Laboratories, Inc., Chicago, Ill., a corporation of Illinois No Drawing. Application February 24, 1945, Serial No. 579,682

4 Claims. (Cl. 195—63)

This present invention relates to meat-tenderizing compositions, and in particular to one in a dry pulverulent form containing sodium chloride as the principal vehicular component for the proteolytic enzyme papain.

Papain is a well known and commercially used agent for tenderizing meat. It is commonly dispensed in liquid form in salt solution for use in restaurants, institutions, and even in the home. Attempts to provide papain in dry composition have not been successful because of a loss of activity by deterioration. The present invention is directed to overcoming this deterioration in a stable dry composition.

It is an object of the invention to provide a dry granular stable papain composition for tenderizing meat.

It is a particular object to provide a dry papain composition containing a large quantity of sodium chloride, which is not subject to loss of activity of the papain.

It is a particular object of the invention to buffer a dry composition of sodium chloride and papain to a pH in the range from 5.5 to 7.

Various other and ancillary objects and advantages of the invention will appear hereinafter.

In studying the loss of activity of papain in dry compositions, these were made with a diluent or vehicular base because the amount of papain necessarily dispensed for actual use is very small. Sodium chloride was used as a base, because it has been heretofore observed in the literature that papain in such salt solution retains its activity, but on drying such solution, the activity is lessened or lost. See article entitled "Drying of papaya latex-stability of papain," by A. K. Balls, H. Lineweaver, S. Schwimmer, of U. S. Dept. of Agriculture. in Industrial and Engineering Chemistry, vol. 32, p. 1277, Sept. 1940. Applicant has also found that freshly dried papain-containing salt solutions lose activity only gradually on aging. This indicated a change to be taking place. Knowing that dry papain is stable and that dry salt is stable, it was suspected that some combination effect is responsible for the loss of activity.

Papain has a pH of about 5.5 and it is known to be stable in compositions of high pH up to 7. Meats to be tenderized have a pH within this range from 5.5 to 7, and usually not over pH of 6.5, and commonly lower.

I have discovered that having present a buffering agent in a dry composition of sodium chloride and papain to maintain the composition in the range of pH from 5.5 to 7, and preferably from 5.5 to 6.5, the papain does not lose its activity upon aging the composition. It is believed that some unknown reaction effects a generation of trace quantities of hydrochloric acid from the sodium chloride, resulting in damage to the papain. The action is believed to be akin to the bleaching of oleoresin of capsicum in a dry vehicle of sodium chloride, which can be remedied by pH control, as set forth in the Griffith and Hall U. S. Patents, No. 1,995,119 through No. 1,995,121, and No. 2,032,612.

According to the present invention then, dry solid sodium-chloride base compositions containing papain are buffered to a pH in the range from 5.5 to 7, and preferably in the range from 5.5 to 6.5. Reference to pH values of the composition of the present invention signifies that the same has been determined on a solution consisting by weight of 1 part of the composition and 9 parts of water, using a glass electrode.

The composition of the present invention may be made as a free-flowing one, so that it may be used in a household to sprinkle on both sides of a piece of meat, as from a shaker, and allowed to stand for about 15 to 20 minutes before cooking.

A very small amount of papain is effective, making it necessary to use small amounts of papain. Hence, a relatively large amount of diluent is used, which is such as to provide the vehicular base of the composition. Since sodium chloride is normally added to season meat, sodium chloride is used. Small quantities of sugar may be present, but this is undesirable because the taste of sugar is not generally acceptable with meat, except with ham. Furthermore, sugar is undesirable in the composition of the present invention because of hygroscopicity, leading to caking of the composition. This is especially true of corn sugar, and of large amounts of any sugar. However, where the dry composition consists of at least 85% sodium chloride, and is adequately buffered, other ingredients may be present, including commercial corn sugar, which contains traces of hydrolyzing acid. The amount of sugar which can thus be present is not sufficient to be distasteful, or to cake the composition, or to exhaust the buffering agent when corn sugar acidity is present.

Other ingredients may be added as desired. Spices and the like may be present, but, in general, these are omitted. However, for the purpose of psychological effect by aroma and as well for taste, the composition is given a meat-like aroma and flavor by including meat-like flavors, such as one or more of the amino acid salts, or a beef extract. A suitable flavor is the residue of a vegetable or animal protein hydrochloric-acid-hydrolysate from which the glutamic acid component has been removed, as is frequently done to manufacture mono-sodium glutamate. Wherein such residue is used as a meat-like flavor, it is usually neutralized by sodium hydroxide or a carbonate to a pH in the range from 5.5 to 7.

Suitable buffering agents are: normal and dibasic sodium or potassium citrate; dibasic ammonium citrate; mono-, di- and triethanolamines or mixtures of them; sodium bicarbonate; calcium carbonate; magnesium carbonate, oxide or hydroxide; disodium phosphate; normal citrates of sodium, potassium, calcium and ammonium; lactates of sodium, potassium, calcium and ammonium. The preferable buffering agents are the normal and secondary sodium citrates, in view of the edible and taste characteristics. However, since but a very small portion of the buffering agent is applied to the meat and consumed with it, a wide range is available.

The product may be a physical mixture of the ingredients, but it is preferred to homogenize all the ingredients other than the vehicular sodium chloride crystals, or at least to homogenize that part of it including the papain and the buffering agent.

The temperature to which the product is subjected in drying affects the activity, the higher a non-killing temperature, the less the activity. Temperatures up to 140° F. may be used, and at this temperature there is some destruction, but also a useful remnant of activity. Above 140° F., the results are unsatisfactory. There is no precise relation between temperature and residual activity, because time is also a factor. Thus small batches more quickly dried at a given temperature are more active than larger batches of the same composition similarly dried but in longer time. In a vacuum pan drier, it takes about 2 hours to dry a 1500 lbs. batch as given below in Example 1, at a temperature not over 120° F., and high activity is obtained. Time may be shortened by use of higher temperatures, but such large batches should not be subjected in drying to temperatures over 140° F., for satisfactory results, but preferably not over 120° F. for the best results.

The following examples illustrate the invention.

Example 1

| | |
|---|---|
| Papain | 67 lbs. 8 ozs. |
| Corn starch | 60 lbs. |
| Normal sodium citrate | 30 lbs. |
| Beef extract | 11 lbs. 4 ozs. |
| Flake salt | 1331 lbs. 4 ozs. |
| Water, 11 gallons | |
| Total | 1500 lbs. solids |

The composition is preferably made by (1) dissolving 5 lbs. of the salt in 5 gals. of the water, and add the papain; (2) dissolve the beef extract in 2 gals. of the water; (3) dissolve the sodium citrate in 4 gals. of the water; (4) mix three solutions; (5) mix the remainder of the salt and the starch in a mixer; (6) mix the liquid into the solid to uniformity; (7) deliver to a vacuum evaporating crystallizer, and dry out the water to a granular product at a temperature not over 160° F. The pH in a 10% solution is 6.4.

The drying is effected at a pressure of 29 inches of mercury, and water is first given off at 77° F. as the material dries in the course of about 2 hours, the vacuum goes up to approach 29½ inches of mercury, and the temperature goes up to approach 115° F. In general, when the water in the receiver drips very slowly, the drying is considered complete, and this may be at a final temperature in the range from 110° to 115° F. in two hours, for the quantity of Example 1 in the particular equipment used.

In the foregoing, the salt is 89% of the composition, the papain about 4.5%, and the buffering agent about 2%. The corn starch is binder for providing a thin skin as a film covering on salt crystals, and it houses the papain, sodium citrate and beef extract flavor.

Example 2

In Example 1 the 30 lbs. of sodium citrate is changed to 15 lbs. of triethanolamine, and the salt is increased by 15 lbs.

Example 3

| | Pounds |
|---|---|
| Papain | 13.5 |
| Animal protein hydrolysate (glutamic-acid free) 33% solids, pH of 7 | 32 |
| Corn starch | 15 |
| Calcium carbonate | 5 |
| Sodium chloride | 300 |

The composition is made substantially as in Example 1. The pH is about 7. The salt is about 88% of the composition.

Example 4

| | | |
|---|---|---|
| Papain | 4.5 | lbs. |
| Potato starch | 5 | lbs. |
| Beef extract | .75 | lb. |
| Triethanolamine | 3.5 | ozs. |
| Sodium chloride | 90 lbs., | 12.5 ozs. |
| Water | 5.5 | pints |

The composition is made substantially as in Example 1. The pH is 6.8. The salt is about 90% of the composition.

Example 5

Mixture A is made first:

| | | |
|---|---|---|
| Flake salt | lbs. | 76 |
| Corn starch | ozs. | 5.5 |
| Papain | ozs. | 1.75 |
| Normal sodium citrate | ozs. | 8 |
| Neutralized vegetable protein hydrolysate (67% water, 4% sodium chloride) at pH of 5.2 | lbs. | 10.5 |
| Sodium bicarbonate | ozs. | 7 |

The above are compounded substantially as in Example 1, to a dry powder of coated salt crystals. It is about 95% sodium chloride.

The following is then physically compounded:

| | | |
|---|---|---|
| Curing salt containing heart-like centers of sodium nitrate and sodium nitrite (about 85% NaCl) | lbs. | 14 |
| Brown sugar | lbs. | 2.5 |
| Clarified sugar | lbs. | 7.5 |
| Sodium bicarbonate | ozs. | 5.75 |
| Mixture A | lbs. | 76 |

In the above, the sodium bicarbonate may be added all or in part to the protein hydrolysate of mixture A in addition to that used in mixture A. The amount of sodium bicarbonate may be varied as required, but it is sufficient to raise the pH of the final mixture to 7. This is necessary owing to the presence of sodium nitrite which otherwise liberates nitrous acid.

The final composition has about 84% of sodium chloride. It is a composition particularly suitable for ham, in slices, or in minced ham preparations. The activity of the papain, once applied to the meat can be stopped by cooking, as in steaming encased meats, or sterilizing canned products, at a temperature of 176° F. for 10 minutes.

Numerous changes and modifications are contemplated as falling within the scope of the appended claims.

I claim:

1. The method which comprises wetting sodium chloride crystals with a film-forming aqueous composition containing papain and a buffering agent, and drying the mass at a temperature not over 140° F. and forming a thin skin as a film coat on the resulting salt crystals, the buffering agent maintaining the composition at a pH in the range from 5.5 to 7 measured as a 10% by weight solution in water.

2. The method of preserving the activity of papain in the presence of sodium chloride which comprises drying at a temperature not over 140° F. and within a period of two hours, an aqueous mass containing sodium chloride and papain in the presence of a buffering agent in quantity maintaining the dried residue at a pH in the range from 5.5 to 7 measured as a 10% by weight solution in water.

3. The method of preserving the activity of papain in the presence of sodium chloride which comprises drying at a temperature not over 120° F. and within a period of two hours an aqueous mass containing sodium chloride and papain in the presence of a buffering agent in quantity maintaining the dried residue at a pH in the range from 5.5 to 7 measured as a 10% by weight solution in water.

4. The method of preserving the activity of papain in the presence of sodium chloride which comprises drying at a temperature not over 120° F. in about two hours, an aqueous mass containing sodium chloride and papain in the presence of a buffering agent in quantity maintaining the dried residue at a pH in the range from 5.5 to 7 measured as a 10% by weight solution in water.

LLOYD A. HALL.

REFERENCES CITED

The following references are of record in the file of this patent:

UNITED STATES PATENTS

| Number | Name | Date |
|---|---|---|
| 2,140,781 | Allen | Dec. 20, 1938 |
| 2,313,875 | Jansen | Mar. 16, 1943 |

OTHER REFERENCES

Frankel: "Studies on Enzyme Action," Jour. Biol. Chem., 31 (1917), p. 209.

Balls et al.: "Drying of Papaya Latex," Ind. and Eng. Chem., Sept. 1940, pp. 1277 and 1279.

Sumner et al.: Enzymes. Academic Press, Inc., Publishers, New York, N. Y., 1943, pp. 7, 18.

Nord et al.: Advances in Enzymology, Interscience Publishers, Inc., New York, 1941, page 79.